United States Patent
Li et al.

(10) Patent No.: US 8,899,649 B2
(45) Date of Patent: Dec. 2, 2014

(54) CLAMPING DEVICE

(71) Applicants: Hong Fu Jin Precision Industry (ShenZhen) Co., Ltd., Shenzhen (CN); Hon Hai Precision Industry Co., Ltd., New Taipei (TW)

(72) Inventors: Bing Li, Shenzhen (CN); Bo Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/955,185

(22) Filed: Jul. 31, 2013

(65) Prior Publication Data

US 2014/0042761 A1 Feb. 13, 2014

(30) Foreign Application Priority Data

Aug. 10, 2012 (CN) .......................... 2012 1 0283966

(51) Int. Cl.
- *B66C 1/42* (2006.01)
- *C25D 17/06* (2006.01)
- *B25J 15/00* (2006.01)
- *C25D 11/00* (2006.01)

(52) U.S. Cl.
CPC ............. B25J 15/0028 (2013.01); C25D 17/06 (2013.01); C25D 11/005 (2013.01); *Y10S 294/902* (2013.01)
USPC ........................ 294/119.1; 294/99.1; 294/902

(58) Field of Classification Search
CPC .. B25J 15/0253; B25J 15/026; B25J 15/0028; B25J 15/12; B65G 47/90; B66C 1/54; B23Q 2703/02

USPC ........ 294/119.1, 207, 93, 99.1, 902; 269/275, 269/263

See application file for complete search history.

(56) References Cited

U.S. PATENT DOCUMENTS

| | | | | |
|---|---|---|---|---|
| 5,125,708 A | * | 6/1992 | Borcea et al. | 294/207 |
| 5,588,796 A | * | 12/1996 | Ricco et al. | 414/741 |
| 5,967,581 A | * | 10/1999 | Bertini | 294/207 |
| 7,422,411 B2 | * | 9/2008 | Downs et al. | 414/741 |

(Continued)

FOREIGN PATENT DOCUMENTS

| | | | | |
|---|---|---|---|---|
| CN | 201483488 U | | 5/2010 | |
| DE | 3428152 A1 | * | 2/1986 | B25J 15/00 |
| DE | 19916765 B4 | * | 4/2012 | B23Q 7/04 |
| WO | WO 2008067846 A1 | * | 6/2008 | B25J 15/02 |

*Primary Examiner* — Saul Rodriguez
*Assistant Examiner* — Gabriela Puig
(74) *Attorney, Agent, or Firm* — Novak Druce Connolly Bove + Quigg LLP (57) ABSTRACT

A clamping device includes a driving mechanism and a pair of clamping mechanisms. Each clamping mechanism includes a clipping member, an installing plate, a positioning member, a resisting plate, and an elastic member. The clipping members are movably connected to the driving mechanism. A protrusion protrudes from the clipping member, and includes a first inclined surface. The installing plate defines an opening. The protrusion passes through the opening. The positioning member is inserted into the installing plate and fixed with the clipping member. The resisting plate is movably mounted on the installing plate. An abutting portion protrudes from the resisting plate, and passes through the opening. The abutting portion comprises a second inclined surface resisting the first inclined surface, the elastic member is sandwiched between the installing plate and the resisting plate, for providing a resetting force to the resisting plate.

17 Claims, 6 Drawing Sheets

(56) References Cited

U.S. PATENT DOCUMENTS

| | | | |
|---|---|---|---|
| 7,669,903 B2 * | 3/2010 | Bonora et al. | 294/188 |
| 8,491,251 B2 * | 7/2013 | Muraoka et al. | 414/739 |
| 8,585,346 B2 * | 11/2013 | Shonai et al. | 414/783 |
| 2003/0067180 A1 * | 4/2003 | Hosokawa | 294/1.1 |
| 2006/0125260 A1 * | 6/2006 | Chae et al. | 294/119.1 |

* cited by examiner

CLAMPING DEVICE

BACKGROUND

1. Technical Field

The present disclosure relates to clamping devices, and particularly to a clamping device for clamping a workpiece to a rack for an anodizing process.

2. Description of Related Art

In a surface process of a workpiece, such as an anodizing process, a rack may be used for holding and positioning the workpiece. The rack may include a pair of elastic sheets for positioning a workpiece. When the workpiece needs to be placed on the rack, a robot arm holds a workpiece, and transfers the workpiece to a position adjacent to the rack latching with one of the elastic sheets. The robot arm presses the other elastic sheet until the workpiece is latched between the pair of elastic sheets. Finally, the robot arm releases the pressed elastic sheet. However, the workpiece is easily scraped during the deformation of the elastic sheet.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
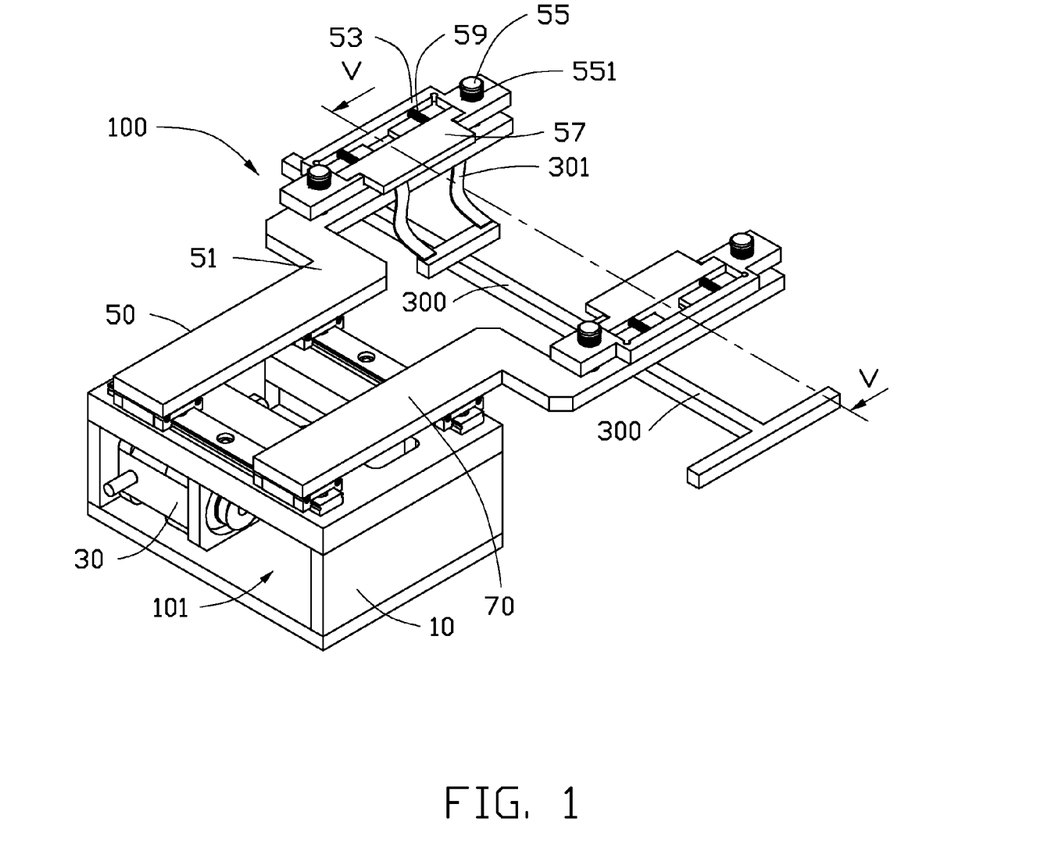
FIG. 1 is an isometric view of an embodiment of a clamping device including a mounting base, a driving mechanism, and a clamping mechanism.
Figure 6:
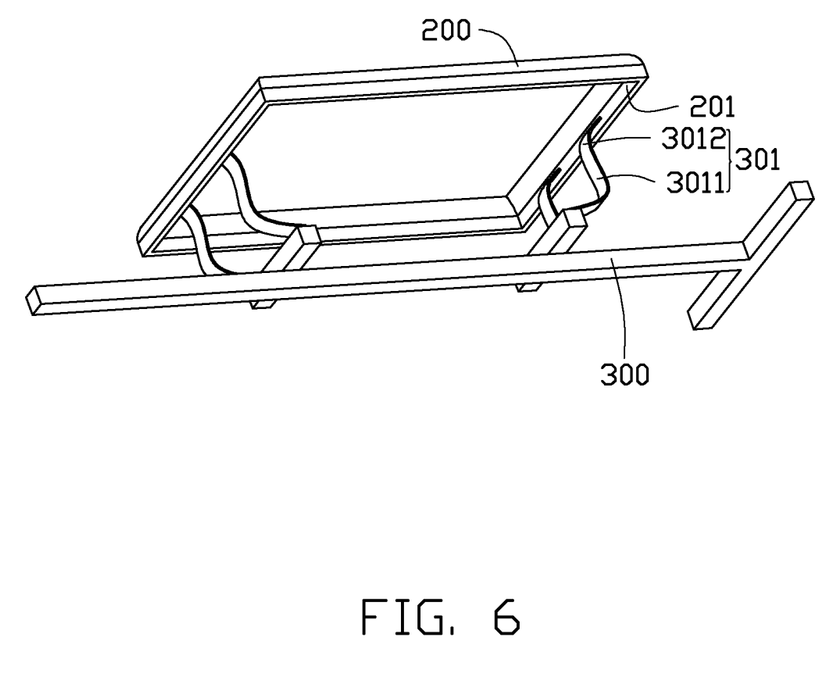
FIG. 6 is an isometric view of a workpiece positioned on a rack using the clamping mechanism shown in FIG. 1.

FIGS. 1 and 6 show one embodiment of a clamping device 100, for clamping and positioning a workpiece 200 to a rack 300. The rack 300 includes four bent elastic sheets 301 at opposite sides of the rack 300. Each of the elastic sheets 301 is substantially S-shaped, and includes a clamping portion 3011 and a resisting portion 3012 bent from a distal end of the clamping portion 3011. A section of the workpiece 200 is substantially U-shaped, and includes opposite inner sidewalls 201. The resisting portions 3012 of the elastic sheets 301 are capable of resisting the inner sidewalls 201 of the workpiece 200, for positioning the workpiece 200 (shown in FIG. 6).

Figure 2:
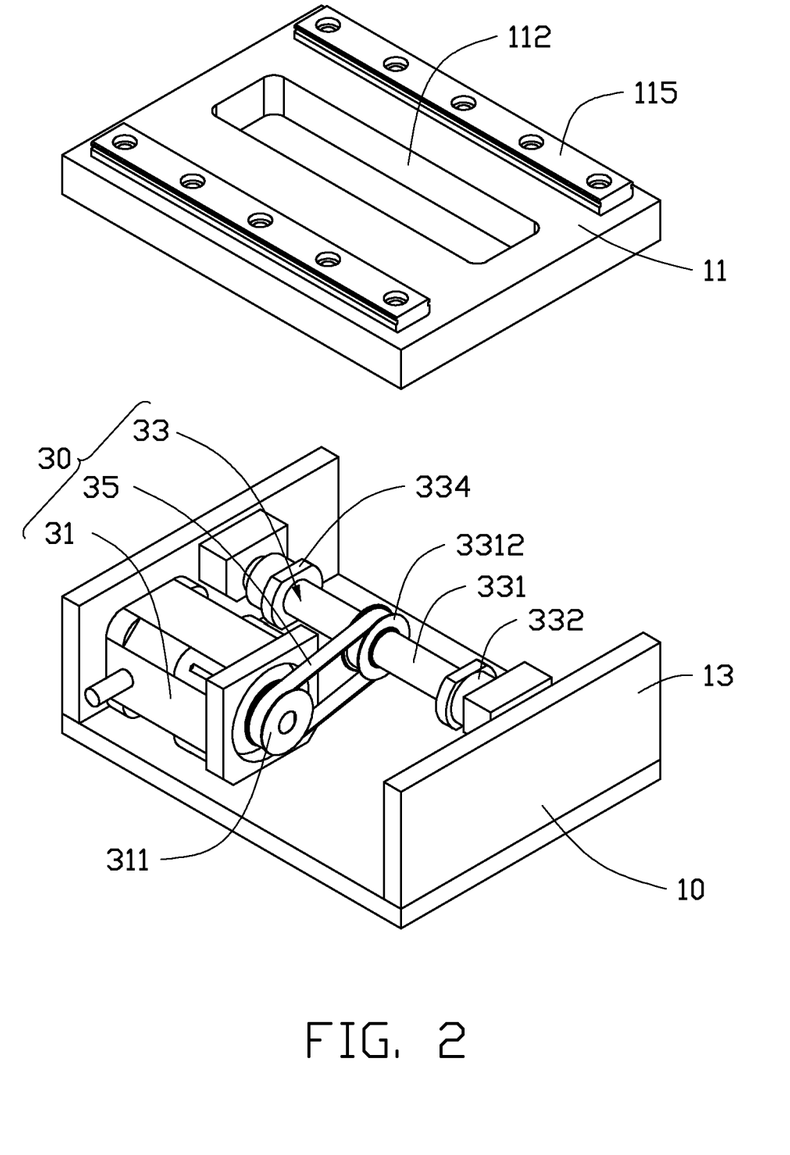
FIG. 2 is a partial, exploded view of the mounting base and the driving mechanism shown in FIG. 1.

The clamping device 100 includes a mounting base 10, a driving mechanism 30, and a pair of clamping mechanisms 50, 70. FIG. 2 shows the mounting base 10 and the driving mechanism 30. The mounting base 10 is a substantially hollow frame, and defines a receiving chamber 101. The mounting base 10 includes a mounting plate 11 and a receiving frame 13 assembled with the mounting plate 11. The receiving frame 13 and the mounting plate 11 define the receiving chamber 101 cooperatively. The mounting plate 11 defines a connecting hole 112 communicating with the receiving chamber 101. A pair of guiding portions 115 are mounted on the mounting plate 11, and are positioned at opposite sides of the connecting hole 112. The pair of the guiding portions 115 are substantially parallel with each other.

The driving mechanism 30 is received in the receiving chamber 101, and includes a driver 31, a guide screw 33, and a transferring belt 35. The driver 31 is mounted on the receiving frame 13 in the receiving chamber 101. A drive pulley 311 is connected to the driver 31. The guide screw 33 is mounted on the receiving frame 13, and is received in the receiving chamber 101. The guide screw 33 is positioned adjacent to the driver 31, and includes a guiding rod 331, a first nut 332, and a second nut 334. The guiding rod 331 is mounted to opposite sidewalls of the receiving frame 13, and is positioned adjacent to the drive pulley 311. The first nut 332 and the second nut 334 are slidably sleeved on the guiding rod 331, and positioned at opposite ends of the guiding rod 331, for linearly sliding along the guiding rod 331 in opposite directions. A slave pulley 3312 is sleeved on the guiding rod 331, and is positioned between the first nut 332 and the second nut 334. The transferring belt 35 is wound on the drive pulley 311 and the slave pulley 3312, to enable the driver 31 to drive the guide screw 33 via the drive pulley 311, the transferring belt 35, and the slave pulley 3312. In the illustrated embodiment, when the driver 31 rotates the slave pulley 3312 along a clockwise direction, the first nut 332 and the second nut 334 move close to each other along the guiding rod 331. When the driver 31 rotates the slave pulley 3312 along a counterclockwise direction, the first nut 332 and the second nut 334 move away from each other along the guiding rod 331.

Figure 3:
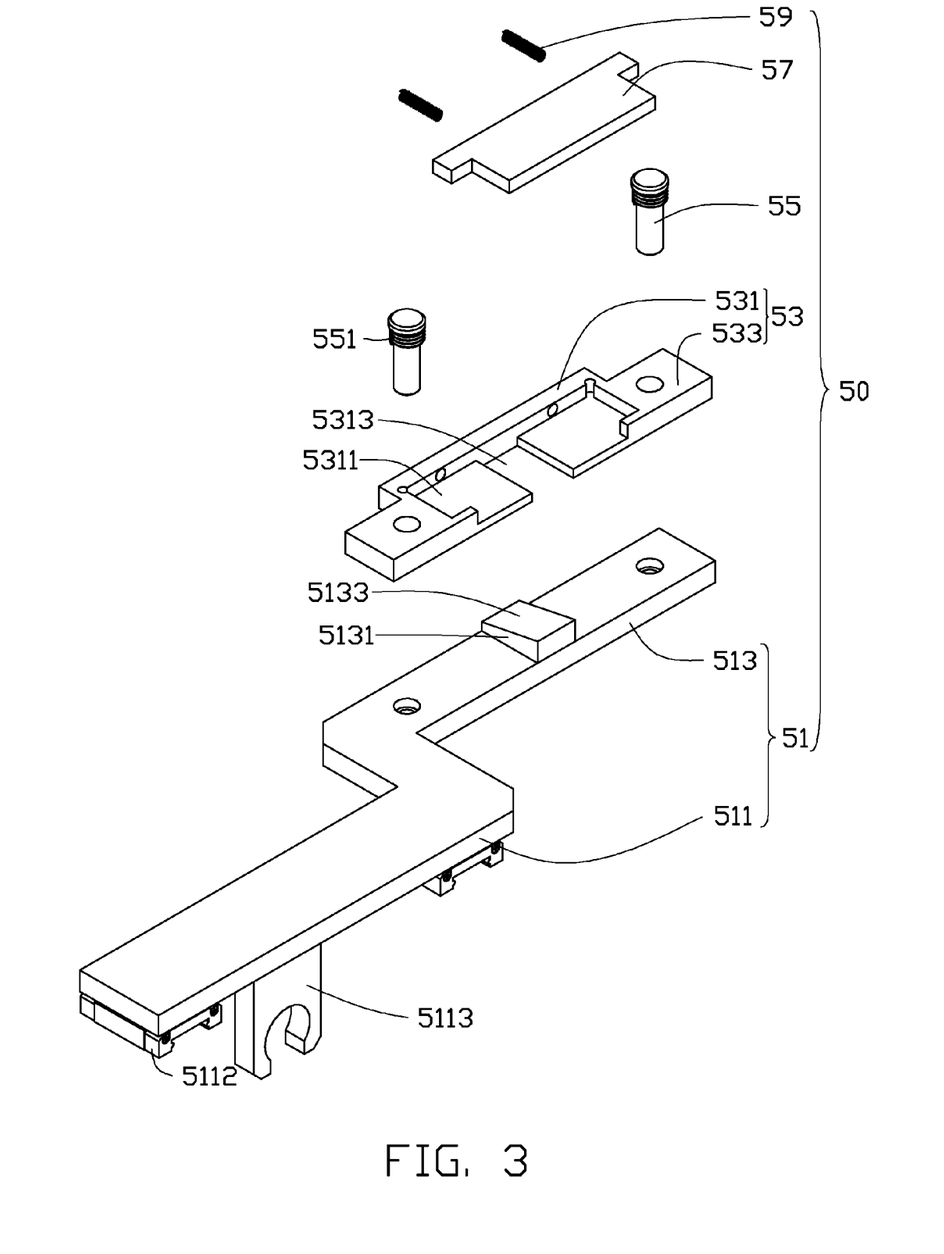
FIG. 3 is an exploded, isometric view of the clamping mechanism shown in FIG. 1.
Figure 4:
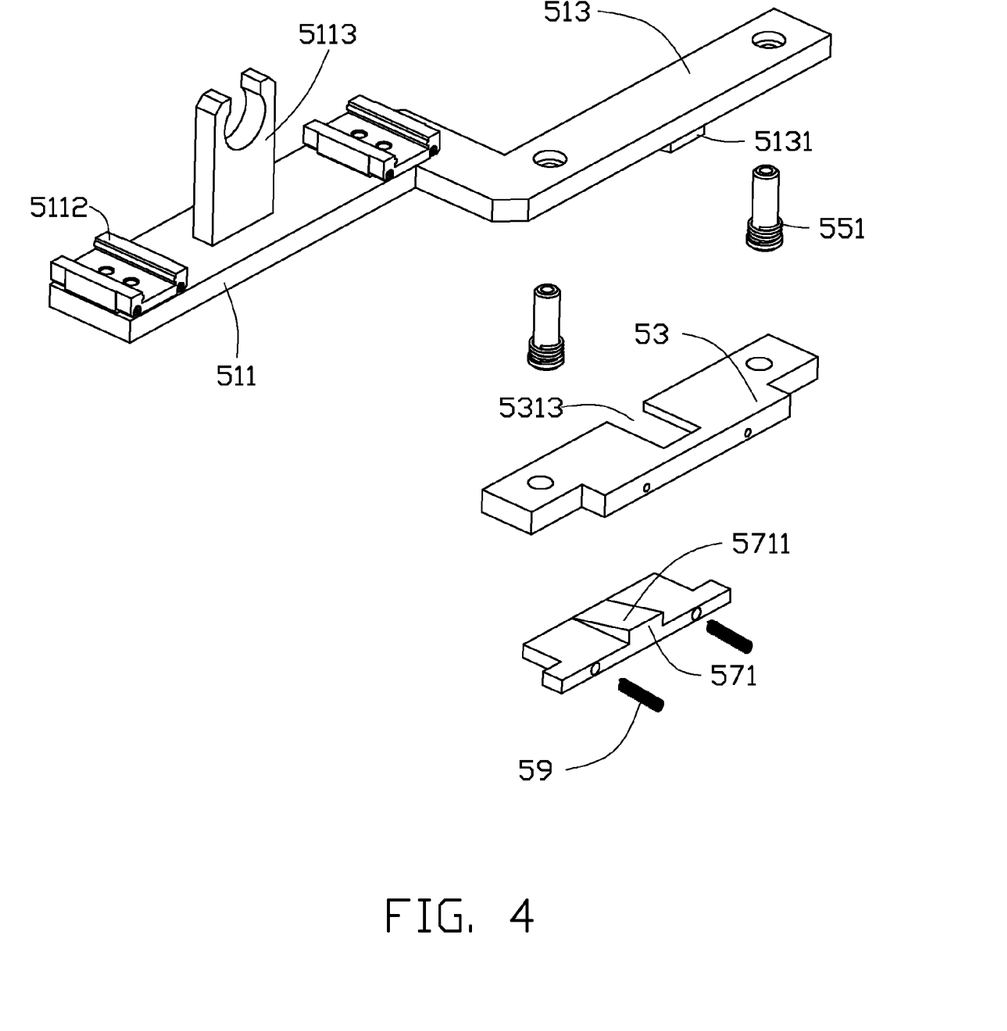
FIG. 4 is similar to FIG. 3, but shown in another aspect.
Figure 5:
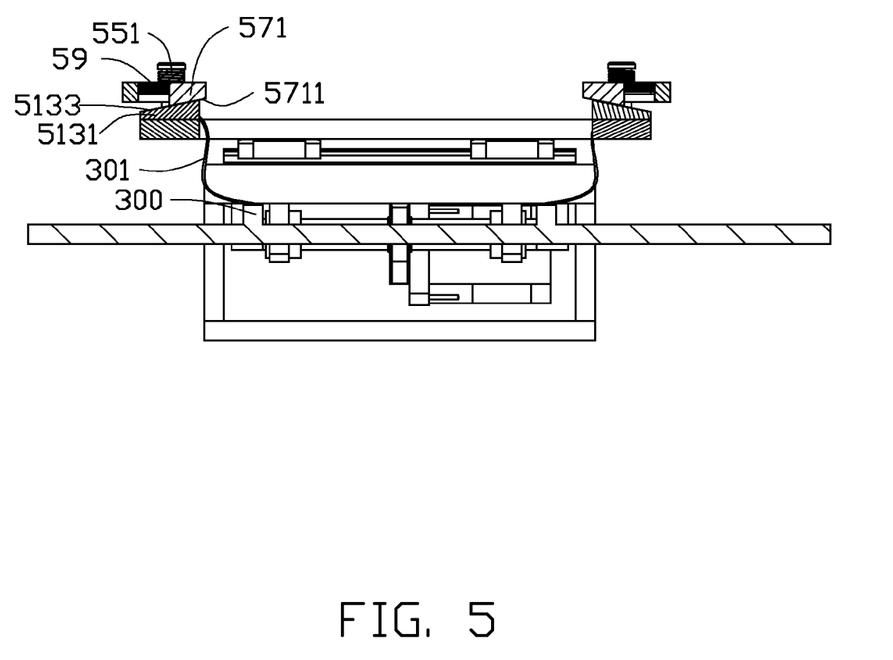
FIG. 5 is a sectional view along a line V-V shown in FIG. 1.

FIGS. 3 to 5 show the pair of clamping mechanisms 50 movably mounted on the guiding portions 115, and are separately arranged relative to each other. One of the pair of clamping mechanisms 50 is positioned on the first nut 332, and the other one is positioned on the second nut 334. Each of the pair of clamping mechanisms 50 includes a clipping member 51, an installing plate 53, two positioning members 55, a resisting plate 57, and two elastic members 59.

Each clipping member 51 is slidably mounted on the guiding portions 115, and is mounted on a corresponding one of the first nut 332 and the second nut 334. Each clipping member 51 includes a connecting portion 511, a clipping portion 513 bent from a distal end of the connecting portion 511, and a protrusion 5131 protruding from the clipping portion 513. The connecting portion 511 is substantially bar shaped. Two sliding arms 5112 are fixed on the connecting portion 511, and separately arranged. The sliding arms 5112 are slidably engaged with the guiding portions 115, thus the clipping member 51 is capable of sliding along the guiding portion 115. A connecting arm 5113 perpendicularly protrudes from the connecting portion 511 of the clipping member 51, and is positioned between the sliding arms 5112. The connecting arm 5113 of one clipping member 51 passes through the connecting hole 112, and is connected to the first nut 332. The connecting arm 5113 of the other clipping member 51 passes through the connecting hole 112, and is connected to the second nut 334. Thus, the clipping members 51 are capable of moving close to or away from each other, driven by the first nut 332 and the second nut 334, thereby clamping or releasing the clamping portions 3011 of the elastic sheets 301

Each clipping portion 513 is bent from the corresponding connecting portion 511 along a direction away from the other connecting portion 511, thus a distance between the clipping portions 513 is larger than a distance between the connecting portions 511. The protrusion 5131 protrudes from a surface of the clipping portion 513 opposite to the connecting arm 5113. The protrusion 5131 includes a first inclined surface 5133 on a top surface. The first inclined surface 5133 is downwardly scoped along a direction away from the opposite clipping member 51.

Each installing plate 53 is movably mounted on the clipping portion 513 of the corresponding clipping member 51. The installing plate 53 includes a main body 531 and a pair of positioning portions 533 extending from opposite ends of the main body 531. The main body 531 defines a mounting groove 5311, and the mounting groove 5311 is positioned between the positioning portions 533. A bottom surface of the mounting groove 5311 defines an opening 5313 corresponding to the protrusion 5131.

The positioning members 55 are movably inserted into the positioning portions 533, respectively, and are fixed on the clipping portion 513. A spring 551 is sleeved on each of the positioning members 55 at an end away from the clipping member 51. The spring 551 resists the corresponding positioning member 55 and the corresponding positioning portion 533, for providing an elastic resetting force to the installing plate 53.

The resisting plate 57 is movably mounted on the installing plate 53, and is received in the mounting groove 5311. The resisting plate 57 includes an abutting portion 571 protruding from a part of the resisting plate 57 corresponding to the opening 5313. The abutting portion 571 passes through the opening 5313, and abuts against the protrusion 5131 of the clipping member 51. The abutting portion 571 includes a second inclined surface 5711 corresponding to the first inclined surface 5133. The second inclined surface 5711 abuts on the first inclined surface 5133, and is capable of sliding on the first inclined surface 5133.

The elastic members 59 are received in the mounting groove 5311, and opposite ends of each elastic members 59 are connected to and resist against a sidewall of the mounting groove 5311 and the resisting plate 57, respectively, providing a resetting force to the resisting plate 57.

In assembly, the driver 31 and the guide screw 33 are mounted in the receiving frame 13, and are received within the receiving chamber 101. The transferring belt 35 is wound on the drive pulley 311 and the slave pulley 3312. The clipping members 51 are separately arranged on the guiding portions 115, and are respectively connected to the first nut 332 and the second nut 334. The installing plates 53 are respectively mounted on the clipping portion 513 of the corresponding clipping member 51. The positioning members 55 are inserted into the positioning portions 533, respectively, and are fixed on the clipping portion 513. The resisting plate 57 is movably mounted within the mounting groove 5311 of the mounting plate 53. The elastic members 59 are received in the mounting groove 5311, and resist against the installing plate 53 and the resisting plate 57.

In use, a workpiece 200 is clamped by the resisting plates 57, and positioned between the resisting plates 57. The clamping device 100 is moved adjacent to a rack 300. The resisting portions 3012 are adjacent to the clipping portion 513 and positioned below the workpiece 200. The driver 31 rotates the drive pulley 311 and the slave pulley 3312 along the clockwise direction, thus the clipping members 51 are driven to move close to each other, and clamp the clamping portions 3011. Because the workpiece 200 is clamped between the resisting plates 57, the workpiece 200 forces the resisting plates 57 to move away from each other, and the elastic members 59 are compressed. When the resisting plates 57 move away from each other, the second inclined surface 5711 slides downwardly on the first inclined surface 5133, and the springs 551 are released. Therefore, a distance of the elastic sheets 301 in opposite sides becomes shorter, and a distance of the workpiece 200 and the elastic sheets 301 becomes shorter. Third, when the distance between elastic sheets 301 in opposite sides is smaller than a distance of opposite inner sidewalls 201 of the workpiece 200, and the elastic sheets 301 are adjacent to the inner sidewalls 201, the driver 31 rotates the drive pulley 311 and the slave pulley 3312 along the counterclockwise direction, thereby driving the clipping members 51 away from each other. The elastic sheets 301 recover and position the workpiece 200 on the inner sidewalls 201. The resisting plates 57 recover with the elastic force of the elastic members 59.

In an alternative embodiment, a number of the guiding portions 115, the positioning members 55, and the elastic members 59 may be one or more than one, for example.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A clamping device for positioning a workpiece on a rack, the clamping device comprising:
   a mounting base;
   a driving mechanism mounted on the mounting base; and
   a pair of clamping mechanisms, each clamping mechanism comprising:
   a clipping member connected to the driving mechanism, the clipping member comprising a protrusion protruding from a part of the clipping member, the protrusion comprising a first inclined surface;
   an installing plate defining an opening, the protrusion being inserted into the opening;
   a positioning member inserted into the installing plate and fixed with the clipping member, a spring resisting against the installing plate and sleeved on the positioning member, for providing an elastic resetting force to the installing plate;
   a resisting plate movably mounted on the installing plate for clamping the workpiece, the resisting plate comprising an abutting portion protruding from a part of the resisting plate corresponding to the opening, the abutting portion comprising a second inclined surface abutting the first inclined surface; and
   an elastic member sandwiched between the installing plate and the resisting plate for providing a resetting force to the resisting plate,
   wherein the clipping members of the pair of clamping mechanisms are movably and separately positioned on the mounting base, and the driving mechanism drives the clipping members to move close to or away from each other to clamp or release the workpiece.

2. The clamping device of claim 1, wherein the installing plate includes a main body, the main body defines a mounting groove, the resisting plate is movably mounted within the mounting groove, and the elastic member resists against a sidewall of the mounting groove and the resisting plate.

3. The clamping device of claim 2, wherein the clipping member comprises a clipping portion, the protrusion protrudes from the clipping portion, the installing plate further comprises a positioning portions extending from the main body, and the positioning member passes through the positioning portion and is fixed to the clipping portion.

4. The clamping device of claim 3, wherein the clipping member further comprises a connecting portion connected to the clipping portion, and a connecting arm protruding from the connecting portion, the mounting base comprises a mounting plate, the driving mechanism is positioned below the mounting plate, the mounting plate defines a connecting hole, and the connecting arm passes through the connecting hole and connected to the driving mechanism.

5. The clamping device of claim 4, wherein the clipping member further comprises a pair of sliding portions protruding from the clipping member, the connecting arm is positioned between the pair of sliding portions, further comprising a pair of guiding portions mounted on the mounting plate, and the pair of sliding portions are engaged with the pair of guiding portions, such that the clipping member is movably mounted on the mounting base.

6. The clamping device of claim 4, wherein the driving mechanism comprises a driver and a guide screw connected to the driver, the driver and the guide screw are mounted on the mounting base, the guide screw is connected to the clipping members, and the driver rotates the guide screw, which drives the clipping members to move close to or away from each other.

7. The clamping device of claim 6, wherein the driving mechanism further comprises a transferring belt wound on the driver and the guide screw, and the driver rotates the guide screw via the transferring belt.

8. The clamping device of claim 7, wherein a drive pulley is sleeved on the driver, the guide screw comprises a guiding rod rotatably mounted on the mounting base, and a slave pulley mounted on the guiding rod, and the transferring belt is wound on the drive pulley and the slave pulley.

9. The clamping device of claim 8, wherein the guide screw further comprises a first nut and a second nut, the first nut and the second nut are sleeved on the guiding rod, the first nut is connected to the connecting arm of one clipping member, and the second nut is connected to the connecting arm of the other one clipping member.

10. A clamping device comprising a driving mechanism and a pair of clamping mechanisms, each clamping mechanism comprising:
   a clipping member connected to the driving mechanism, the clipping member comprising a protrusion protruding from a part of the clipping member, the protrusion comprising a first inclined surface;
   an installing plate defining an opening receiving the protrusion;
   a positioning member inserted into the installing plate and fixed with the clipping member;
   a resisting plate movably mounted on the installing plate, the resisting plate comprising an abutting portion protruding from a part of the resisting plate, the abutting portion inserted into the opening, and comprising a second inclined surface abutting the first inclined surface; and
   an elastic member sandwiched between the installing plate and the resisting plate to provide a resetting force to the resisting plate,
   wherein the clipping members of the pair of clamping mechanisms are movably and separately positioned on the driving mechanism, and the driving mechanism drives the clipping members to move close to or away from each other.

11. The clamping device of claim 10, wherein the installing plate includes a main body and a positioning portions extending from the main body, the main body defines a mounting groove, the resisting plate is movably mounted within the mounting groove, and the elastic member resists against a sidewall of the mounting groove and the resisting plate, and the positioning member passes through the positioning portion, and is fixed to the clipping member.

12. The clamping device of claim 10, wherein the clipping member comprises a connecting portion and a clipping portion bent from the connecting portion, a distance between the clipping portions of the pair of clamping mechanisms is larger than a distance between the connecting portions of the pair of clamping mechanisms.

13. The clamping device of claim 12, wherein the clipping member further comprises a connecting arm protruding from the connecting portion, the clamping device further comprises a mounting base, the mounting base comprises a mounting plate and a receiving frame assembled with the mounting plate, the receiving frame and the mounting plate define a receiving chamber cooperatively, the driving mechanism is received in the receiving chamber, the mounting plate defines a connecting hole, and the connecting arm passes through the connecting hole, and is connected to the driving mechanism.

14. The clamping device of claim 13, wherein the clipping member further comprises a pair of sliding portions protruding from the clipping member, the connecting arm is positioned between the pair of sliding portions, the clipping member further comprises a pair of guiding portions mounted on the mounting plate, and the pair of sliding portions are engaged with the pair of guiding portions, such that the clipping member is movably mounted on the mounting base.

15. The clamping device of claim 10, wherein the driving mechanism comprises a driver and a guide screw, the guiding screw comprises a guiding rod, a first nut, and a second nut, the guiding rod is connected to the driver, the first nut and the second nut are sleeved on the guiding rod, the first nut is connected to the connecting arm of one clipping member, the second nut is connected to the connecting arm of the other one clipping member, and the driver rotates the guiding rod, the first nut and the second nut slide along the guiding rod along opposite directions.

16. The clamping device of claim 15, wherein the driving mechanism further comprises a transferring belt, a drive pulley sleeved on the driver, and a slave pulley mounted on the guiding rod, the transferring belt is wound on the drive pulley and the slave pulley.

17. The clamping device of claim 10, wherein the first inclined surface of each clipping member is downwardly scoped along a direction away from the opposite clipping member.

* * * * *